(12) United States Patent
Lee

(10) Patent No.: US 9,862,313 B2
(45) Date of Patent: Jan. 9, 2018

(54) AERO PART FOR VEHICLE HAVING VIRTUAL ENGINE SOUND OUTPUT FUNCTION

(71) Applicant: Hyundai Motor Company, Seoul (KR)

(72) Inventor: Chan Hee Lee, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 173 days.

(21) Appl. No.: 14/872,955

(22) Filed: Oct. 1, 2015

(65) Prior Publication Data

US 2016/0311368 A1  Oct. 27, 2016

(30) Foreign Application Priority Data

Apr. 22, 2015  (KR) .................. 10-2015-0056254

(51) Int. Cl.
*B60Q 5/00* (2006.01)
*B62D 35/00* (2006.01)
*B60H 1/00* (2006.01)
*G10K 15/04* (2006.01)

(52) U.S. Cl.
CPC ......... *B60Q 5/008* (2013.01); *B60H 1/00564* (2013.01); *B62D 35/005* (2013.01); *B62D 35/007* (2013.01); *G10K 15/04* (2013.01)

(58) Field of Classification Search
CPC ...... A63H 17/34; B60H 1/00; B60H 1/00564; B60Q 1/506; B60Q 5/00; B60Q 5/005; B60Q 5/008; B62D 35/00; B62D 35/005; B62D 35/007; G10K 9/02; G10K 15/04
USPC ..... 116/28 R, 35 R, 37, 56, 57, 60, 67 R, 74
See application file for complete search history.

(56) References Cited

U.S. PATENT DOCUMENTS

| 2,594,013 | A | * | 4/1952 | Hahn | ................. | G10K 9/04 |
| | | | | | | 116/137 R |
| 4,678,118 | A | * | 7/1987 | Fukami et al. | .... | B60H 1/00492 |
| | | | | | | 180/903 |
| 6,254,451 | B1 | * | 7/2001 | Bean | ................. | G10K 9/04 |
| | | | | | | 446/202 |
| 6,832,574 | B1 | * | 12/2004 | Coconas | ............. | G10K 5/00 |
| | | | | | | 116/137 R |
| 7,465,213 | B1 | * | 12/2008 | Pribbanow | ........ | A01M 31/004 |
| | | | | | | 446/202 |
| 2005/0142982 | A1 | * | 6/2005 | Sceery | ............. | G10K 9/04 |
| | | | | | | 446/207 |
| 2007/0181053 | A1 | * | 8/2007 | Gray | ................. | G10K 9/10 |
| | | | | | | 116/59 |
| 2012/0312609 | A1 | * | 12/2012 | Takewaka et al. | .... | B60Q 5/008 |
| | | | | | | 180/65.1 |

FOREIGN PATENT DOCUMENTS

| DE | 102012001822 | A1 | * | 8/2012 | ............ | B60Q 5/008 |
| DE | 202013009278 | U1 | * | 1/2015 | .......... | G10K 11/004 |
| EP | 0632428 | A2 | * | 1/1995 | .............. | B60L 3/00 |
| JP | 2006-347368 | A | | 12/2006 | | |

(Continued)

*Primary Examiner* — R. A. Smith
(74) *Attorney, Agent, or Firm* — Morgan, Lewis & Bockius LLP

(57) ABSTRACT

An aero part for vehicles, which is mounted in a vehicle and has a virtual engine sound output function may include a reed vibration sound generator disposed in an inner space of the aero part to generate sound as a reed vibrates by an air stream introduced into the inner space of the aero part through a vent hole during vehicle traveling.

8 Claims, 4 Drawing Sheets

(56) References Cited

FOREIGN PATENT DOCUMENTS

| | | |
|---|---|---|
| JP | 2006-347369 A | 12/2006 |
| JP | 2011-55697 A | 3/2011 |
| KR | 10-1180805 B1 | 9/2012 |
| KR | 10-2013-0123227 A | 11/2013 |
| KR | 10-2014-0080314 A | 6/2014 |
| KR | 10-2014-0080318 A | 6/2014 |
| KR | 10-2014-0080909 A | 7/2014 |
| KR | 10-1427622 B1 | 8/2014 |
| KR | 10-1427625 B1 | 8/2014 |
| KR | 10-1526602 B1 | 6/2015 |

* cited by examiner

SPOILER

AIR DAM

A-A CROSS SECTION

AERO PART FOR VEHICLE HAVING VIRTUAL ENGINE SOUND OUTPUT FUNCTION

CROSS-REFERENCE TO RELATED APPLICATION

The present application claims priority to Korean Patent Application No. 10-2015-0056254 filed Apr. 22, 2015, the entire contents of which is incorporated herein for all purposes by this reference.

BACKGROUND OF THE INVENTION

1. Field of the Invention

The present disclosure relates to an aero part for vehicles. More particularly, it relates to an aero part for vehicles which is capable of generating virtual engine sound.

2. Description of Related Art

In recent years, environmentally friendly vehicles, including hybrid vehicles that travel with power of an electric motor and an engine as well as fuel cell vehicles and electric vehicles that travel only with power of an electric motor, are receiving attention.

Among these environmentally friendly vehicles, traveling modes of hybrid vehicles include an Electric Vehicle (EV) mode in which an engine is turned off and a vehicle travels only with power of an electric motor. Electric vehicles and fuel cell vehicles have no engine (internal combustion engine) that generates noise.

Accordingly, when traveling only with power of the electric motor, the vehicle becomes a low noise state generating very low traveling noise. Therefore, there is a risk of generation of accidents as a pedestrian (in particular, a person who is visually impaired) near the vehicle cannot recognize the presence of the vehicle.

To solve the problem as described above, the environmentally friendly vehicles are provided with a Virtual Engine Sound System (VESS) that outputs virtual noise via a speaker to the outside of the vehicle so as to assist pedestrians in easily recognizing the presence of surrounding vehicles and whether vehicles approach to the pedestrians.

A conventional VESS generates noise via an electronic circuit and outputs the noise via a speaker to cause, for example, a nearby pedestrian to recognize the presence of a vehicle.

At this time, there is a need to mount the speaker for noise output as well as electronic circuit parts or other electric and electronic parts of a control unit for noise generation to the vehicle, which causes many problems such as spatial limitations because it is necessary to assure mounting positions and mounting spaces of the respective parts.

In addition, it is necessary to assure complicated control logics and speakers electronic circuit parts or other electric ted configuration to generate noise in electric and electronic manners causes a high failure frequency and is disadvantageous in terms of durability.

In addition, there are disadvantages such as a high price due to part costs and a heavy weight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an aero part for vehicles, which is configured to generate virtual engine sound using only simplified parts without high price and complicated electric and electronic parts or a speaker for sound generation, thereby solving problems such as, for example, excessive spatial limitation, complicated control logics, poor durability, excessively high price, and an excessive weight of a conventional virtual engine sound system (VESS).

According to various aspects of the present invention, an aero part for vehicles, which is mounted in a vehicle and has a virtual engine sound output function may include a reed vibration sound generator disposed in an inner space of the aero part to generate sound as a reed vibrates by an air stream introduced into the inner space of the aero part through a vent hole during vehicle traveling.

The aero part for vehicles may include a spoiler disposed on an outer surface of a vehicle body, the sound generator being installed in an inner space of the spoiler.

The aero part for vehicles may include an air dam mounted to a bottom of a front end of the vehicle, the sound generator being installed in an inner space of the air dam.

The sound generator may include a case fixedly disposed in the inner space of the aero part to permit introduction of air thereinto, the reed disposed inside the case and configured to vibrate by an air stream passing through an inside of the case to implement sound generation, and a resonant cylinder disposed inside the case and configured to reinforce vibration of the reed to implement external sound output by resonance.

The sound generator may be connected to an air feeder of the vehicle, and vibration of the reed and sound generation may be implemented by a vehicle-induced air stream introduced through the vent hole during vehicle traveling and air stream supplied by the air feeder.

The sound generator may include a first inlet in communication with the vent hole for introduction of the vehicle-induced air stream, a second inlet for introduction of the air stream supplied by the air feeder, and an opening/closing device configured to selectively open or close a flow path of the second inlet.

The opening/closing device my include a door configured to selectively open or close a flow path of the second inlet, and an actuator configured to vary a position of the door so as to open or close the flow path of the second inlet by rotating the door, in which a controller may be set to selectively open or close the flow path of the second inlet by controlling driving of the actuator based on a vehicle speed.

The controller may be set to control driving of the actuator to close the flow path of the second inlet when the vehicle speed is equal to or greater than a set reference speed and to control driving of the actuator to open the flow path of the second inlet when the vehicle speed is below the reference speed.

The air feeder may include a cooling fan configured to cool parts of the vehicle, or a blowing fan and an air compressor configured to supply air to the parts of the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As known, a vehicle is equipped with various aerodynamic parts, i.e. aero parts, which adjust the influence of air during traveling and control an air stream around the vehicle to improve aerodynamic performance of the vehicle.

The aero parts may include, for example, a front spoiler installed to the outer surface of a vehicle body at a front end of the vehicle, a rear spoiler installed to the outer surface of the vehicle body at a rear end of the vehicle, and an air dam mounted to a bumper.

Figure 1A:
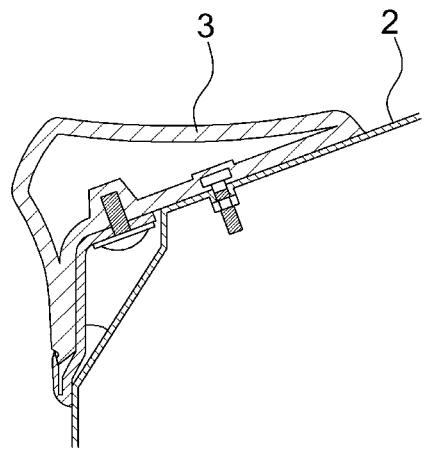
FIG. 1A and FIG. 1B are views illustrating a rear spoiler that is mounted to a rear end of a vehicle body and an air dam that is mounted to the bottom of a vehicle bumper.
Figure 1B:
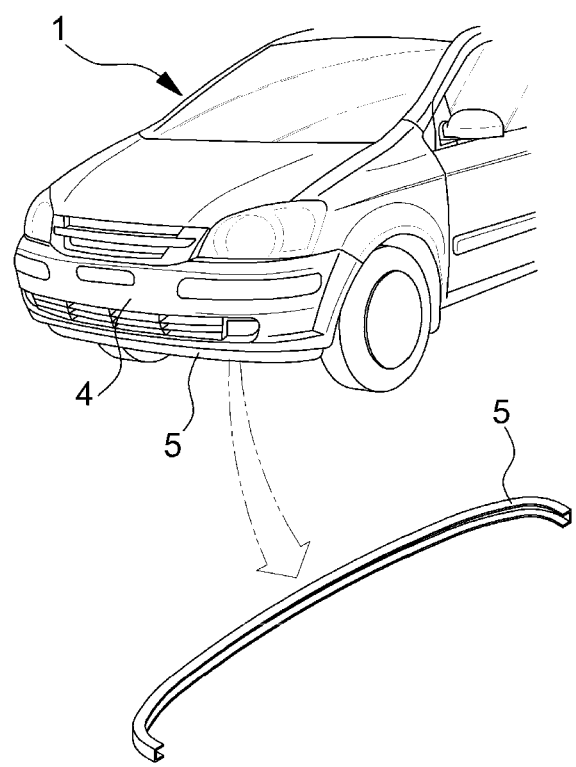

FIG. 1A and FIG. 1B are views illustrating a rear spoiler 3 that is mounted to a vehicle body 2 at a rear end of a vehicle 1 and an air dam 5 that is mounted to a bottom of a vehicle bumper 4.

The illustrated spoiler 3 is a part that controls an air stream around the vehicle body 2 during vehicle traveling to enable stabilized traveling of the vehicle. The spoiler 3 causes the air stream to push the vehicle body 2, thereby preventing the ground force of tires from being weakened and improving acceleration performance of the vehicle.

The illustrated air dam 5 at the bottom of the bumper 4 serves to adjust an air stream by causing air (vehicle-induced air stream) to pass through a vent hole during vehicle traveling, rather than blocking an air stream in the vehicle 1, and to allow the vehicle body 2 to come into close contact with a road surface while reducing air resistance during vehicle traveling.

The present invention relates to the aero part, such as the spoiler 3 or the air dam 5, mounted to the vehicle as described above and has a major feature in that a sound generator, which is capable of generating sound using an air stream introduced during vehicle traveling, is installed in the spoiler 3 or the air dam 5.

The sound generator is installed in an inner space of the spoiler 3 or the air dam 5 so as not to be externally exposed and is configured to generate sound while air introduced to the inner space of the spoiler 3 or the air dam 5 passes therethrough during vehicle traveling.

Here, sound serves as virtual engine sound (noise) of an existing virtual engine sound system (VESS) and means sound that is capable of drawing the attention of a pedestrian who is located near the vehicle.

Figure 2:
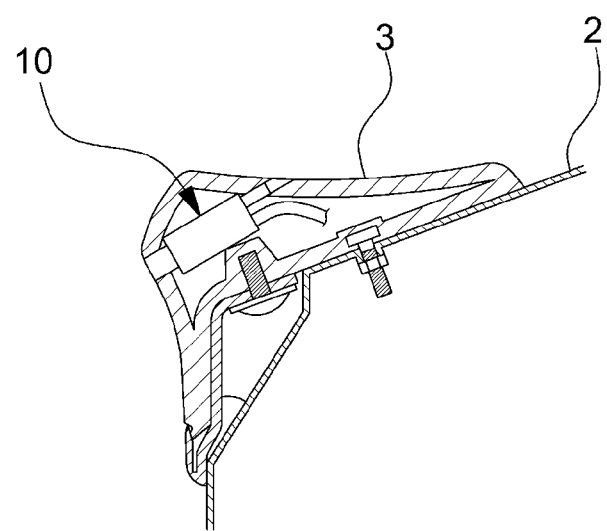
FIG. 2 is a sectional view illustrating an exemplary aero part according to the present invention.
Figure 3A:
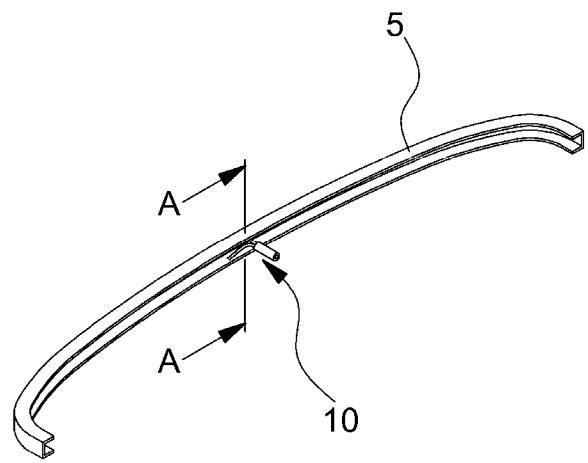
FIG. 3A and FIG. 3B are sectional views illustrating an exemplary aero part according to the present invention.
Figure 3B:
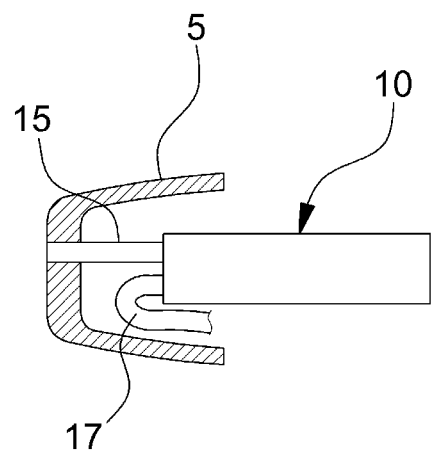

FIG. 2, FIG. 3A and FIG. 3B are sectional views illustrating aero parts according to various embodiments of the present invention. FIG. 2 illustrates a configuration of an aero part having a virtual engine sound output function in which a sound generator 10 is installed inside the rear spoiler 3 mounted to the vehicle body 2, and FIG. 3A and FIG. 3B illustrate a configuration of an aero part having a virtual engine sound output function in which the sound generator 10 is installed inside the air dam 5 mounted to, for example, the bottom of the vehicle bumper 4.

Figure 4:
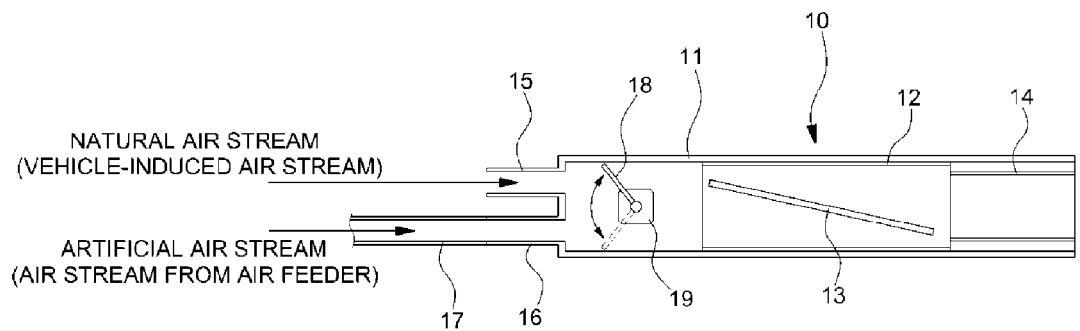
FIG. 4 is a sectional view illustrating a configuration of a sound generator according to the present invention.

FIG. 4 is a sectional view illustrating a configuration of the sound generator according to various embodiments of the present invention.

As illustrated, the sound generator 10 is installed inside the spoiler 3 or the air dam 5. The sound generator 10 generates sound by passing air, introduced into the spoiler 3 or the air dam 5, therethrough during vehicle traveling.

In various embodiments, the sound generator 10 may be a reed vibration type sound generator, which generates sound required in the vehicle in a manner similar to the sound generation principle of a wind instrument, i.e. by vibrating a reed 13 with an air stream.

The reed vibration type sound generator 10 includes a case 11 fixedly installed inside the spoiler 3 or the air dam 5 to permit introduction of air thereinto, a reed 13 installed inside the case 11 to vibrate by an air stream passing through the inside of the case 11 for sound generation, and a resonant cylinder 14 installed inside the case 11 to reinforce vibration of the reed 13 to enable external sound output by resonance.

The sound generator 10 is installed at one side of an inner space of the aero part, i.e. the spoiler 3 or the air dam 5, or an inner space defined between the spoiler 3 or the air dam 5 and the vehicle body 2. At this time, a single or a plurality of sound generators 10 may be installed in a single aero part.

The case 11 has an inlet portion formed at one side thereof for introduction of air. The case 11 and the sound generator 10 are installed such that air (vehicle-induced air stream) introduced through a vent hole of the spoiler 3 or the air dam 5 during vehicle traveling may be introduced thereinto through the inlet portion.

At this time, introduction of air through the vent hole of the aero part, i.e. the spoiler 3 or the air dam 5 is implemented by a vehicle-induced air stream generated during vehicle traveling. The sound generator 10 is installed at an appropriate position of the inner space of the aero part, to allow the vehicle-induced air stream, introduced through the vent hole of the spoiler 3 or the air dam 5, to be introduced to the case 11 through the inlet portion and, thereafter, pass through the reed 13 to generate sound.

In addition, the sound generator 10, the case 11 constituting the sound generator 10, and a reed fixing part 12 to be described below are appropriately arranged to achieve a structure for passage of a vehicle-induced air stream introduced into the spoiler 3 or the air dam 5.

The case 11 is a part that receives an air stream for sound generation and guides the air stream to the reed 13. The case 11 guides air, introduced through the inlet portion, to the reed 13 inside the reed fixing part 12.

The reed fixing part 12 serves to pass and guide air to allow the air introduced to the case 11 to flow to the reed 13. The reed fixing part 12 is located in an inner space of the case 11 and, in turn, the reed 13 is installed inside the reed fixing part 12.

The reed 13 inside the reed fixing part 12 is installed to vibrate by an air stream. Thus, the reed 13 generates sound by vibrating by an air stream in a manner similar to a wind instrument's reed.

At this time, the flow rate of air introduced to the inside of the sound generator 10 varies based on a vehicle speed and vibration of the reed 13 varies based on the flow rate of air. Thus, there occurs a natural increase or reduction in vibration frequency based on the flow rate of air.

The resonant cylinder 14 serves as an echo cylinder that increases the amplitude of vibration of the reed 13 to generate a desired level of sound required in the vehicle. The resonant cylinder 14 is a part that implements artificial tone adjustment of sound generated by the reed 13.

Meanwhile, when the vehicle travels at a middle/high speed that is equal to or greater than a predetermined speed, the sound generator 10 may generate a required level of sound using only a natural air stream, i.e. a vehicle-induced air stream. However, the natural air stream, i.e. the vehicle-induced wind required to generate sound cannot be supplied when the vehicle travels at a low speed or stops. Therefore, there is a need to use an external air feeder that is capable of forcibly introducing air to the sound generator.

At this time, the air feeder may be any one selected from among a cooling fan, a blowing fan, and an air compressor which are already installed in the vehicle. Air supplied by the air feeder may be introduced to the inside of the sound generator 10, i.e. the inside of the case 11 through the inlet portion.

To this end, a hose 17 is connected, at one end thereof, to one side of the inlet portion of the case 11 to supply at least some of the air supplied by the air feeder. As such, even when the vehicle travels at a low speed or stops, an air stream required to generate sound may be supplied to the sound generator 10.

Among the aforementioned examples of the air feeder, the cooling fan may be a radiator fan, or a cooling fan of an air-cooled type cooling device configured to cool parts of the vehicle.

In addition, the blowing fan may be any blowing fan installed to supply air to specific parts of the vehicle or certain places that require air. In the case of a fuel cell vehicle, the blowing fan may be an air blower that supplies air such as oxidizing agent gas to a fuel cell.

In addition, the air compressor may be installed to supply compressed air in the vehicle. The air compressor is used in any one of various locations of the vehicle. For example, the compressor may be used to supply air as oxidizing agent gas to a fuel cell.

In the present invention, the cooling fan, the blowing fan, and the air compressor, which are already installed in the vehicle, are not limited to the above description and may include various other ones so long as they can supply air to a vehicle during traveling without limitations.

As the hose 17 extends to connect an outlet side of the air feeder to the inlet portion of the sound generator 10 inside the aero part, at least some of the air supplied by the air feeder may be supplied to the sound generator 10.

Meanwhile, different air input methods may be selected between the case where the sound generator 10 uses a natural air stream (vehicle-induced air stream) for vibration of the reed 13 and the case where the sound generator 10 uses an artificial air stream supplied by the air feeder.

That is, a natural air stream, i.e. a vehicle-induced air stream may be used when the vehicle travels at a middle/high speed, and an artificial air stream provided by the air feeder may be used when the vehicle travels at a low speed or stops.

To this end, the inlet portion of the sound generator 10 (the inlet portion of the case 11) includes a first inlet 15 that is in communication with the vent hole of the aero part to receive a natural air stream (vehicle-induced air stream) and a second inlet 16 to receive air supplied by the air feeder. The hose 17 extending from the air feeder is connected to the second inlet 16.

In addition, in the case where the air feeder is a cooling fan, a blowing fan, or an air compressor inside the vehicle that needs to be continuously driven during vehicle traveling and is adapted to continuously supply air regardless of a vehicle speed, in order to allow a natural air stream, i.e. a vehicle-induced air stream to be used when the vehicle travels at a middle/high speed, an opening/closing device 20 may be installed to selectively block introduction of air through the second inlet 16.

The opening/closing device 20 includes a door 18 to selectively open or close a flow path of the second inlet 16 (a flow path extending from the second inlet 16 to the inside of the reed fixing part 12) and an actuator 19 to vary a position of the door 18 by rotating the door 18.

The door 18 may be located inside the inlet portion of the case 11, i.e. in front of the reed 13 and the reed fixing part 12. The actuator 19 may be a small motor that is driven under control by a control signal of a controller.

At this time, the controller varies a position of the door 18 by controlling driving of the actuator 19 based on a vehicle speed detected by a vehicle speed detector (not illustrated) so as to selectively open or close the flow path of the second inlet 16. When the vehicle travels at a middle/high speed that is equal to or greater than a predetermined reference speed, the controller causes the flow path of the second inlet 16 to be closed by the door 18. When the vehicle travels at a low speed or stops, the controller varies a position of the door 18 to open the flow path of the second inlet 16 so as to allow air supplied by the air feeder to be introduced to the sound generator 10.

For example, in the case where the air feeder is an air blower or an air compressor that is continuously driven to supply air as oxidizing agent gas to a fuel cell during traveling of a fuel cell vehicle, or a cooling fan to cool parts of the vehicle, the controller controls driving of the actuator 19 such that the flow path of the second inlet 16 is opened by the door 18 when the vehicle travels at a low speed below the reference speed or stops, thereby allowing air supplied by the air feeder to be introduced to the sound generator 10 for sound generation and output.

On the other hand, under the condition that the vehicle speed is equal to or greater than the reference speed, the controller controls driving of the actuator 19 such that the flow path of the second inlet 16 is closed by the door 18, thereby allowing a vehicle-induced air stream to be introduced to the sound generator 10 so as to enable sound generation and output.

As described above, in the present invention, as the sound generator 10, which includes the reed 13 and permits passage of air, is installed inside the aero part, the aero part may be configured to acquire a virtual engine sound output function using the sound generation principle of a wind instrument.

As is apparent from the above description, an aero part for a vehicle according to the present invention has the following advantages.

First, as a reed vibration type sound generator having a simplified configuration using an air stream introduced during vehicle traveling is added inside an aero part that is already installed in a vehicle, the present invention may achieve generation of virtual engine sound without using complicated and high price electric and electronic parts and a speaker for sound generation and output. Therefore, the present invention may solve problems such as spatial limitations as compared to a conventional VESS including electric and electronic control parts and a speaker for control and generation/output of virtual engine sound. That is, the present invention has an advantage of eliminating a demand for a mounting position and space for an additional system in a vehicle cabin.

Second, the present invention may solve problems of the conventional VESS such as, for example, complicated control logics, excessive weight, and speaker's sound pressure performance. In addition, owing to elimination of complicated electronic circuit parts, other electric and electronic parts of a control unit, the speaker and the like, the present invention may achieve a simplified system configuration, reduced failure frequency, improved durability, and low costs.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An aero part for vehicles, which is mounted in a vehicle and has a virtual engine sound output function, comprising:
    a reed vibration sound generator disposed in an inner space of the aero part to generate sound as a reed vibrates by an air stream introduced into the inner space of the aero part through a vent hole during vehicle traveling,
    wherein the sound generator is connected to an air feeder of the vehicle, and vibration of the reed and sound generation are implemented by a vehicle-induced air stream introduced through the vent hole during vehicle traveling and air stream supplied by the air feeder.

2. The aero part of claim 1, wherein the aero part for vehicles includes a spoiler disposed on an outer surface of a vehicle body, the sound generator being installed in an inner space of the spoiler.

3. The aero part of claim 1, wherein the aero part for vehicles comprises an air dam mounted to a bottom of a front end of the vehicle, the sound generator being installed in an inner space of the air dam.

4. The aero part of claim 1, wherein the sound generator includes:
    a case fixedly disposed in the inner space of the aero part to permit introduction of air thereinto;
    the reed disposed inside the case and configured to vibrate by an air stream passing through an inside of the case to implement sound generation; and
    a resonant cylinder disposed inside the case and configured to reinforce vibration of the reed to implement external sound output by resonance.

5. The aero part of claim 1, wherein the sound generator includes:
    a first inlet in communication with the vent hole for introduction of the vehicle-induced air stream;
    a second inlet for introduction of the air stream supplied by the air feeder; and
    an opening/closing device configured to selectively open or close a flow path of the second inlet.

6. The aero part of claim 5, wherein the opening/closing device includes:
    a door configured to selectively open or close a flow path of the second inlet; and
    an actuator configured to vary a position of the door so as to open or close the flow path of the second inlet by rotating the door,
    wherein a controller is set to selectively open or close the flow path of the second inlet by controlling driving of the actuator based on a vehicle speed.

7. The aero part of claim 6, wherein the controller is set to control driving of the actuator to close the flow path of the second inlet when the vehicle speed is equal to or greater than a set reference speed and to control driving of the actuator to open the flow path of the second inlet when the vehicle speed is below the reference speed.

8. The aero part of claim 1, wherein the air feeder comprises a cooling fan configured to cool parts of the vehicle, or a blowing fan and an air compressor configured to supply air to the parts of the vehicle.

\* \* \* \* \*